United States Patent [19]

Hansen et al.

[11] Patent Number: 4,568,713
[45] Date of Patent: Feb. 4, 1986

[54] HOT MELT POLY(BUTYLENE/ETHYLENE) ADHESIVES

[75] Inventors: David R. Hansen; David J. St. Clair, both of Houston, Tex.

[73] Assignee: Shell Oil Company, Houston, Tex.

[21] Appl. No.: 615,409

[22] Filed: May 30, 1984

[51] Int. Cl.⁴ .................. C08J 3/20; C08F 210/08
[52] U.S. Cl. ........................... 524/291; 524/274; 524/488; 524/579; 525/210; 525/211; 525/240; 526/348; 526/348.6
[58] Field of Search ............. 524/488, 599, 274, 291; 525/210, 211, 240; 526/348.6, 348

[56] References Cited

U.S. PATENT DOCUMENTS

| | | | |
|---|---|---|---|
| 3,251,792 | 5/1966 | Homberg et al. | 524/304 |
| 3,370,036 | 2/1968 | Martinovich | 524/299 |
| 3,869,416 | 3/1975 | Hoh | 524/272 |
| 4,031,058 | 6/1977 | Cella | 524/559 |
| 4,164,427 | 8/1979 | Godfrey | 524/307 |
| 4,279,659 | 7/1981 | Unmuth | 524/277 |
| 4,284,541 | 8/1981 | Takeda et al. | 524/272 |
| 4,390,677 | 6/1983 | Karol et al. | 526/348.6 |
| 4,410,649 | 10/1983 | Cieloszyk | 524/245 |
| 4,451,633 | 5/1984 | Brownscombe et al. | 526/159 |
| 4,454,281 | 6/1984 | Heitz et al. | 524/399 |
| 4,460,364 | 7/1984 | Chen et al. | 524/505 |

OTHER PUBLICATIONS

C.A. 87-102998 (Miyanishi) 1977-J7749259.
C.A. 99-159632(y) (Mitsubishi) 1983-JP5867772.
C.A. 101-25100(z) (Asahi) JP5920361 (1984).

Primary Examiner—Herbert J. Lilling
Attorney, Agent, or Firm—Jennifer R. Daunis

[57] ABSTRACT

Hot melt adhesives with long open time and good cold metal bonding are made of blends of an at least partially crystalline copolymer of butene-1 and ethylene, an aliphatic, substantially non-polar resin, an antioxidizing agent and, optionally, microcrystalline wax.

6 Claims, 3 Drawing Figures

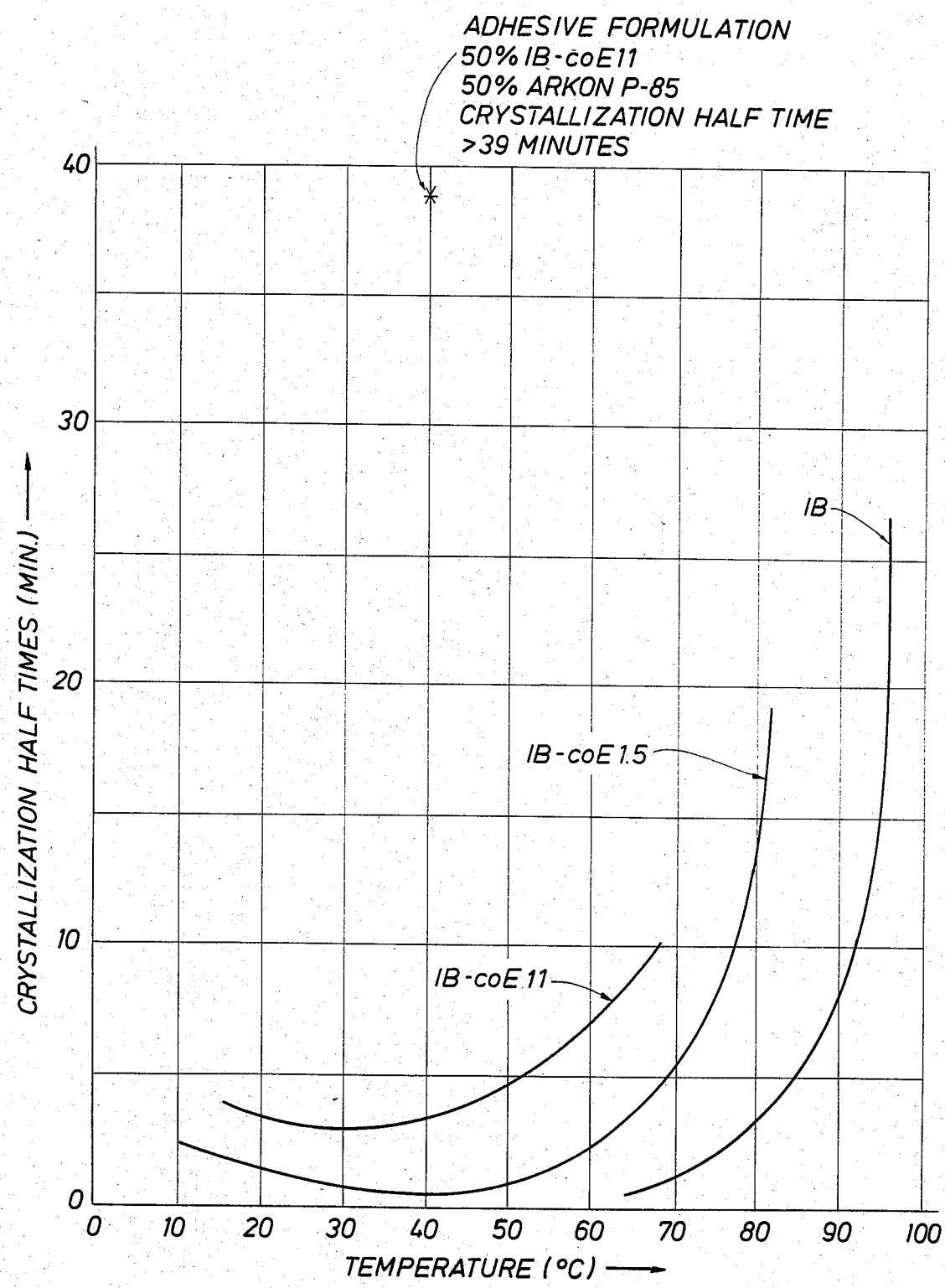

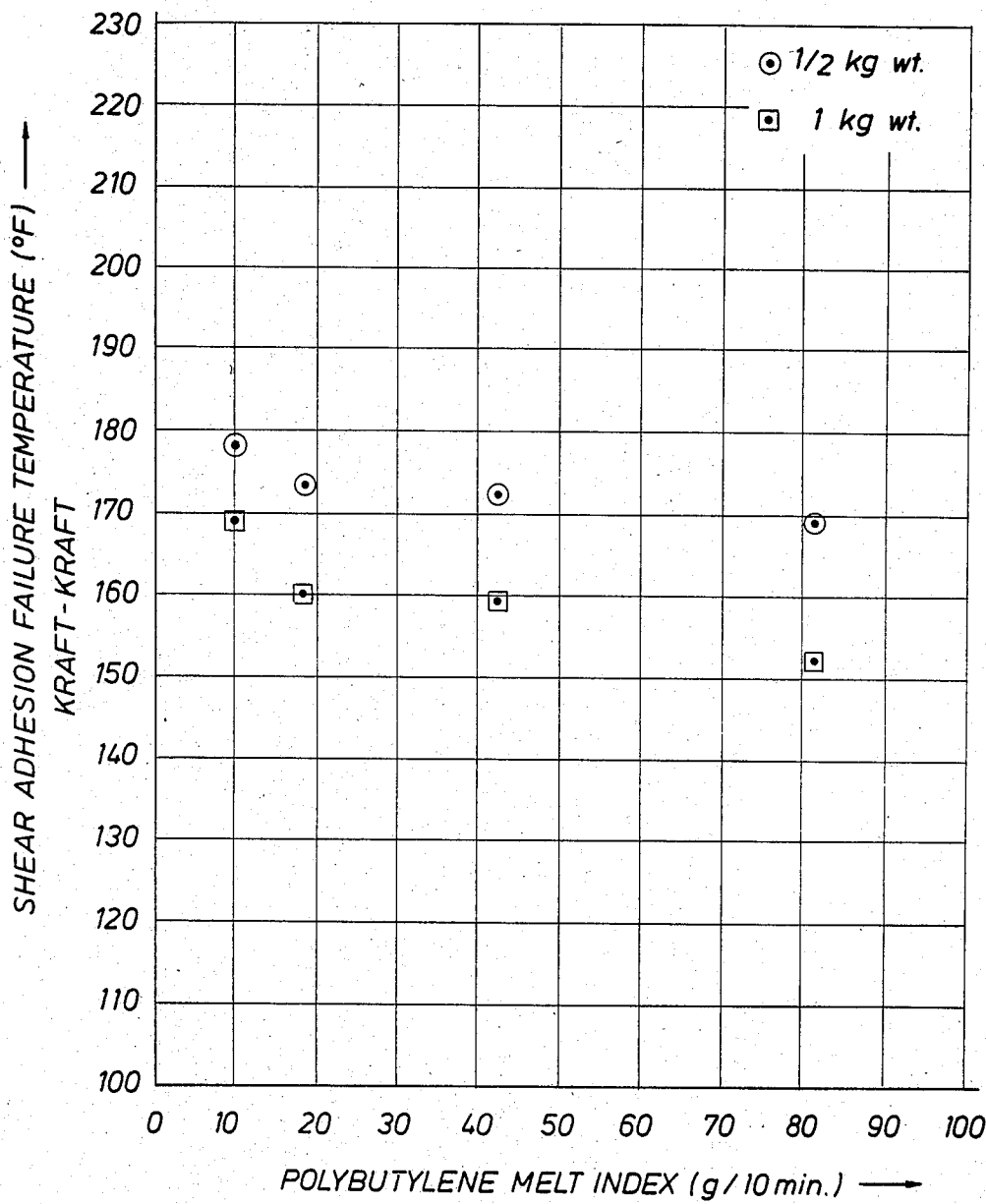

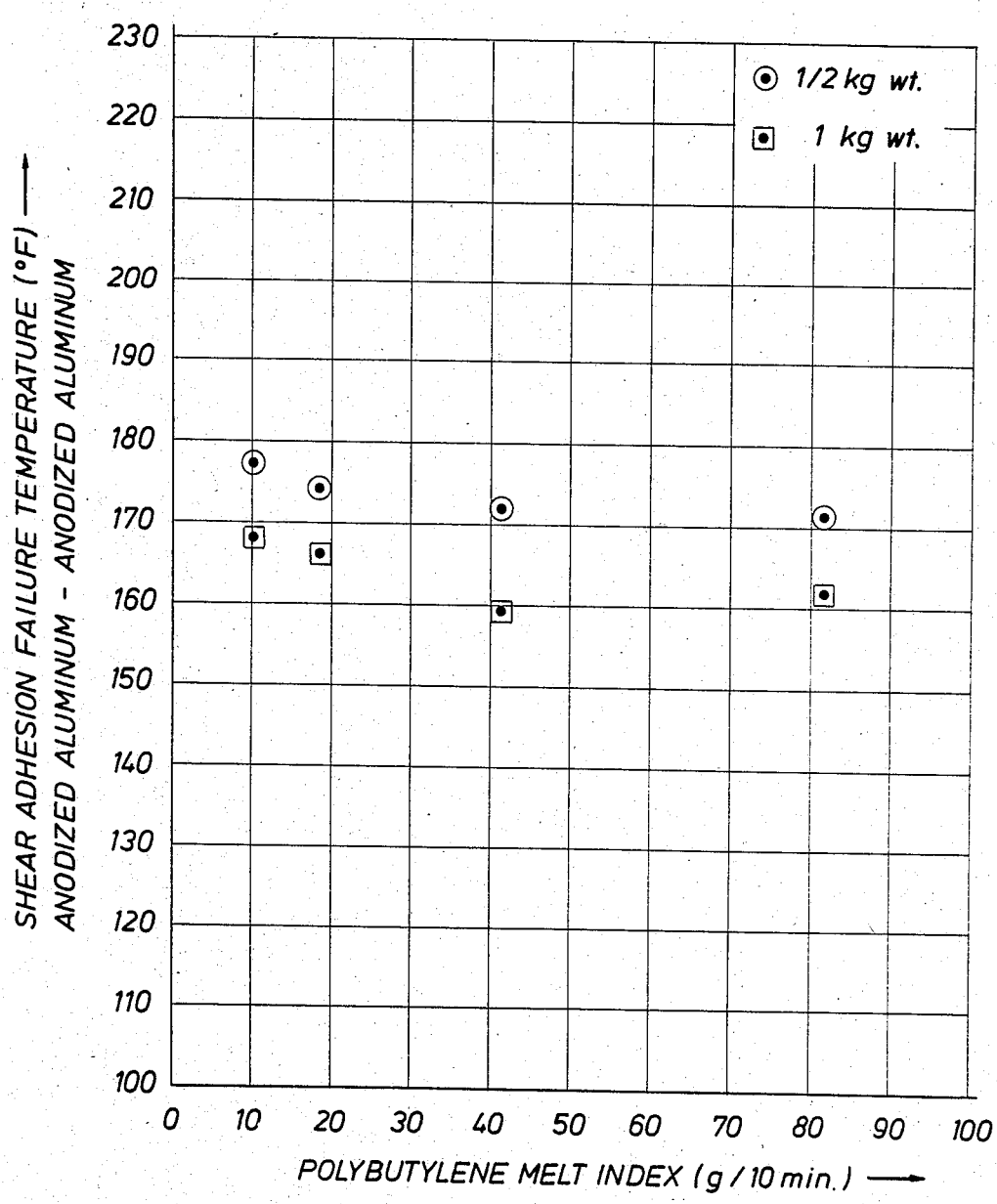

HOT MELT POLY(BUTYLENE/ETHYLENE) ADHESIVES

BACKGROUND OF THE INVENTION

This invention relates to hot melt adhesives which exhibit good cold metal bonding and a long open time. In particular, this invention relates to hot melt butene-1 and ethylene copolymer adhesives.

Adhesive open time which we are referring to is the maximum time at which auto-adhesion (adhesion to itself or to a substrate) can take place for material after it is cooled from the melt to room temperature. Hot melt adhesives which exhibit a long open time (greater than 20 minutes), as well as good cold metal bonding, have long been sought for various applications which require a long open time. For example, expansive surfaces to be coated by adhesives such as table tops to which formica is bonded or assembly line auto parts which are coated with adhesive and later contacted with other parts at some point further down the assembly line are particularly suited to the use of hot melt adhesives which display long open times. Sometimes adhesive coated parts must remain uncontacted for as long as several hours, and thus, require longer open times than are exhibited by and characteristic of other polymers typically used in nonpressure sensitive hot melt adhesives.

Hot melt adhesives can be formulated to be pressure sensitive and have an infinite open time but these adhesives are usually soft, tacky and have limited strength and adhesion. Conventional hot melts such as formulations of poly(ethylene/vinylacetate), polyethylenes, polyamides, or polyesters are rigid, form good strong bonds to certain substrates but have short open times usually less than 1 minute. Moreover, these adhesives usually have problems in adhearing to cold metal substrates which is often required for assembly line production.

Solvent applied contact adhesives can be formulated to give good bond strengths and reasonable open times but they require the use of solvents which can be a toxic, a pollutant and a fire hazard. The polybutylene adhesives are unique in that they require no solvents, have long open times, and show improved adhesion to cold metal substrates.

The poly-1 butene polymers are a unique group of olefinic polymers because they crystallize very slowly. The very slow crystallization rate in contrast to the crystallization rates of other polyolefin crystalline polymers such as EVAs, polyethylenes and polypropylenes, has been found, to be beneficial in formulating hot melt adhesives which have very long open times as well as good adhesion and bonding to cold, heat-sink type substrates—metals such as stainless steel and anodized aluminum for example.

U.S. Pat. No. 3,573,240 describes hot melt adhesive compositions for hard cover book binding. The nature of the book binding process is such that an adhesive which rapidly sets and which has an extremely short open time is desired. Column 4, lines 1 through 7 of '240 disclose that mirror amounts i.e., up to about 5% by weight of alpha olefin comonomers such as ethylene and propylene may be present in the butene-1 polymerization system without any substantial loss of the desirable properties displayed by the resultant essentially homopolymeric system. '240 also states in column 2, lines 61 through 63 that the hot melt adhesive products of '240 display good heat stability and *rapid setting speed*. Thus, '240 teaches that even though up to about 5% by weight of ethylene may be added to the butene-1 polymerization system, the polymerization system exhibits rapid setting speed (short open time). Thus, '240 is inopposite from the teachings of the present invention—that the addition of small amounts of ethylene to the butene-1 polymer in combination with certain resins of the present invention results in extremely long open time.

Polybutylene polymers are composed of linear chain molecules with the regular and spacially ordered arrangement of ethyl side groups, the pendant groups that result when one butene is polymerized across the 1,2 carbon double bond (along an ethylene chain backbone) (U.S. Pat. No. 3,362,940. When cooled from melt, the ethyl side groups initially align in a tetragonal spatial arrangement, developing a little over one half of the ultimate crystallinity (form II). With time, the tetragonal crystalline phase transforms into a stable hexagonal spatial arrangement with subsequent development of additional crystallinity (form I). This is a very slow process, the transformation being completed in the neat polymer over a period of several days.

Butene-1 can be copolymerized with a variety of alpha-olefins to provide useful copolymers such as those taught in U.S. Pat. No. 3,362,940. Butene-1/ethylene copolymers, with ethylene in the 11–20 mole percent range are of special interest in hot melt adhesives, as the ethylene comonomer produces a lower glass transition temperature (Tg) amorphous phase, reduces further the crystallization rate, and reduces the ultimate level of crystallinity in the polymer. Such are advantages in the development of long open time melt adhesives, as a lower Tg polymer and a higher amorphous phase polymer offers wider formulating latitude in combination with compatible resins, waxes, oils, fillers and additives.

SUMMARY OF THE INVENTION

It has been surprisingly found that the polybutene-1/ethylene copolymers recrystallize slowly where the ethylene content of the copolymers is from about 5.5 percent by weight to about 10% by weight, and which copolymers are combined with aliphatic substantially non-polar resins, antioxidant and an optional amount of a microcrystalline wax. The adhesive formulations of the present invention exhibit extremely long open time of greater than 20 minutes and in some case greater than 300 minutes (5 hours). In addition, such hot melt adhesives bond well to cold substrates such as stainless steel and anodized aluminum. The adhesives of the present invention possess good adhesive strength, are flexible, and have low melt viscosities. In addition, the shear adhesion failure temperature (SAFT or service temperature) may be controlled to remain sufficiently high for the product applications of this invention.

Other product uses of the adhesive of the present invention include but are not limited to use as a contact adhesive for assembly of furniture, miscellaneous robot assembly, as an automotive sealant and as an addition to atactic polypropylene, to improve open time in bonding.

DRAWINGS

FIG. 1 is a graph of crystallization half times versus temperature for various pure polybutylene polymers and one polybutylene adhesive formulation.

FIG. 2A is a graph of the shear adhesion failure temperature (Kraft-Kraft) versus polybutylene melt index with ½ kilogram and 1 kilogram shear loads.

FIG. 2B is a graph of the shear adhesion failure temperature (anodized aluminum—anodized aluminum) versus polybutylene melt index with ½ kilogram and 1 kilogram shear loads.

DETAILED DESCRIPTION OF THE INVENTION

The copolymer of the present invention is a polybutene-1 copolymer with from about 5.5% by weight (11 mole percent) to about 10% by weight (20 mole percent) polyethylene. Polymers discussed herein are identified as H-1 B (homopolymeric 1-butene), 1B-CoE 1.5 (1.5 mole percent coethylene in 1-butene) and 1B-coE 11.0 (11.0 mole percent coethylene in 1-butene).

A summary of polybutylene neat polymer properties contrasting homopolymer butene-1 with coethylene butene-1 polymers is shown in Table 1a. The 1-B-coE 1.5 copolymer is the butene-1 ethylene copolymer containing 1.5 mole percent (0.75 percent by weight) ethylene while the third copolymer contains 11.0 mole percent (5.5 percent by weight) ethylene. The Tg of the amorphous phase of the 11 mole percent ethylene butene-1 copolymer is substantially lower than that of the butylene homopolymer and the 1.5 mole percent ethylene butene-1 copolymer.

Polybutylene with various melt flows or viscosities were produced by mixing zero to 1000 ppm of Lupersol 101 peroxide, available from Pennwalt, with polybutylene pellets and extruding the mixture through a Brabender extruder at 200° C. with an average residence time of 2 minutes.

TABLE 1a
Physical Properties of Polybutylene Polymers

| Property Units | $T_m$[1], °C. | $T_g$[2], °C. | Tensile Yield[3], mPa (psi) | Tensile/Elongation mPa (psi)/% |
|---|---|---|---|---|
| Hompolymers | | | | |
| melt index[4] of 1.8 to 20[5] | 125 | −25 | 13.8 (2000)[a] | (b)/350[a] |
| 1B-coE1.5 | | | | |
| melt index 2.0 | 110 | −26 | 11.7 (1700)[a] | 31.0 (4500)[a]/350[a] |
| melt index 100[5] | 107 | −26 | 11.0 (1600) | 28.3 (4100)/390 |
| 1B-coE11.0 | | | | |
| melt index 0.2 | 102 | −34 | 5.52 (800) | 23.7 (3440)/490 |
| melt index 20[5] | 100 | −34 | 5.66 (820) | 27.6 (4010)/520 |
| melt index 99[5] | 99 | −34 | 5.45 (790) | 21.7 (3150)/480 |

[1][2]Crystalline melting temperature ($T_m$) and glass transition temperature ($T_g$) as determined by Differential Scanning Calorimetry.
[3]ASTM D-638, type "C" die @ 50 cm/minute.
[4]ASTM D-1238, condition E.
[5]Cracked from low melt flow using a Brabender extruder and peroxides.
[a]Nominal value.
[b]Nominal values in a range of 29.0-31.0 mPa (4200-4500 psi).

To formulate adhesives the butene-1 ethylene copolymer is added to a substantially non-polar aliphatic tackifier resin. Included in the definition of substantially non-polar are the polyterpene resins. For the most part, partially hydrogenated $C_9$ based hydrocarbon resins, as well as $C_5$ stream resins, and polyterpenes are used in amounts of from about 20% by weight to about 60% by weight and preferably 30% to 50% by weight. Resins with 85° and 125° C. softening points were used (Arkon P-85 and Arkon P-125 respectively). Both show crystalline melting points and Tgs above room temperature; $T_m=47°$ C., $T_g=35°$ C. for the 85° C. softening point resin, and $T_m=77°$ C., $T_g=66°$ C. for the 125° C. softening point resin (D.S.C.). Both resins form clear melts and clear solids upon cooling in polybutylene polymers.

The waxes of the present invention are microcrystalline waxes, however, paraffinic waxes were used as a contrast with the present invention and are identified with corresponding melting points. The waxes are optional and may be from about 10% by weight to about 20% by weight of the adhesive composition. Shellwax ®500 was used (60° C. and 80° C. melting point for comparison of the copolymers) as well as 61° C. paraffinic wax. A sufficient amount of the wax, preferably 10% by weight, can be used, if desired, to effect a lower viscosity without a substantial decrease in service temperature of the adhesive.

In the examples, a hindered phenolic antioxidant was used. Unless otherwise noted, tetrakis methylene (3,5 di-tert-butyl-4-hydroxyhydrocinnamate) methane (Irganox ®1010 from Ciba-Geigy) was used at a level of 0.3% by weight. Other antioxidants which may be used are Goodrite 3114, Ethanox 330 and Irganox 1076.

EXAMPLE I

Adhesive Preparation

Adhesives were prepared using either a small Brabender compound head (approximately 50 cc capacity) or a one quart sigma blade mixer. The test formulations were easily blended using preheated equipment (170°-180° C.) by introducing the polybutylene polymer, mixing until a soft, homogeneous mass is formed, and then gradually introducing the remaining ingredients. Mixing times were 20 minutes.

EXAMPLE II

Adhesive Film

Thin adhesive films (125 to 200 microns) were prepared by casting onto release coated polyester film (onto release coated side) using a pair of heated nip rolls that are adjusted to produce the desired gap, hence adhesive thickness. Preheated adhesive (at about 130° C.) was poured onto a polyester film and hand drawn through the heated nip rolls. Using this technique, adhesive films a meter in length by 15 centimeters in width were produced with a small quantity (<60 gms) of adhesive, so that very small quantities of adhesive could be evaluated.

Once cooled and allowed to set, these adhesives were used to prepare test specimens. For example, Kraft paper to Kraft paper bonds were made by cutting adhesive squares from the polyesters film, peeling them off, placing the adhesive between the paper and heat sealing with a hot bar sealer. Alternately, the adhesive square or an adhesive strip may be placed on a piece of plastic or metal substrate, melted with a heat gun (or in an oven), and then joined under moderate contact pressure to form lap shear or SAFT bonded substrate specimens.

TESTING METHODS

1. Adhesive Hot Melt Viscosity—Viscosities were measured at 177° C. in a Brookfield Thermocell Viscometer with an RVT head and Number 29 spindle (ASTM D3236); for low viscosity formulations, a number 21 spindle was used.

2. SAFT: Shear Adhesion Failure Temperature—The upper service temperature limit of the adhesive was estimated by the SAFT test. A 25×25 mm lap shear specimen was formed with the substrate of interest, the adhesive as the interlayer between the substrate surfaces. In the case of Kraft paper, National Bureau of Standards, Standard Reference Material 1810, Linerboard, was used. The lap shear specimen was suspended in a temperature programmed oven, and the free end of the specimen was loaded at 500 or 1000 gm. The temperature was programmed to rise at a rate of 22° C./hour. The SAFT was taken at the temperature at which the bond fails and the weight-load falls.

Lap Shear Strength—A 25×25 mm lap shear specimen was formed with the substrate of interest, the adhesive as the interlayer between the substrate surfaces. Specimens were drawn apart at a rate of 1.27 mm/min. on an Instron tester, and the maximum force required to break the bond was recorded. Because the magnitude of force required to break the adhesive bonds of crystalline/olefinic polymer based recipes was large, substrates chosen for this test were metals. About 0.75 mm thickness (30 mils) mild steel or stainless steel were used for testing. 3 mm (125 mils) anodized aluminum was also used.

4. Adhesive Open Time—Open time is defined as the maximum time at which auto-adhesion (contact adhesion) can take place for a material which, after melting, is brought to room temperature. In our study open time was measure by applying test recipes as a hot melt onto two surfaces at ambient temperature, waiting the specified time, then pressing the surfaces together under moderate pressure (adhesive to adhesive contact). Within 10 minutes of this bond formation, the surfaces were pulled slowly apart under tension. Bonds that did not fail at the adhesive/adhesive interface (as a function of time) marked maximum open time.

5. Polymer Melt Index—Melt index (abbreviated MI or M.I. throughout) was determined according to ASTM D1238, condition E, temperature (190° C.) and load (2160 g). These conditions are typically used for EVA and polyethylene polymers.

6. Tm and Tg by Differential Scanning Colorimetry (D.S.C.)—Heating and cooling rates were 10° C./minute. Tm is the temperature at which a maximum occurs in the crystalline melting caloric peak. For resins, Tg was determined by drawing a tangent to the subtle shoulder in the heating portion of the D.S.C. cycle, determining the mid-point of this tangent, and reading the temperature at this mid point.

7. Crystallization half times by DSC—The crystallization half time was measured using the DSC. The sample was melted in the DSC pans at 140° C. The temperature was then lowered as quickly as possible to the desired temperature. The time for one half of the crystalline phase to crystallize was recorded. This usually corresponded to the peak in the exotherm time curves since the peaks were nearly symmetrical.

8. Degree of crystallinity—The degree of crystallinity of the polybutylene polymers was determined by intergrating the area under the melting point of the DSC curve and thereby determining the number of calories/gm of sample that was required to melt the sample. Knowing that pure crystalline polybutylene (form I) requires 30 calories/gm to melt, the degee of crystillinity can be calculated.

In formulating the polybutylene adhesives with different tackifying resins and different copolymer content polybutylenes, it was observed that the brittleness of the adhesive could vary dramatically. For many applications it would be desirable to have a more flexible adhesive so the bond would be less sensitive to impact. It was found that the brittleness temperature could be estimated from the calculated Tg of the amorphous resin of the adhesive (amorphous polybutylene and tackifying resin) using the following empirical equation for compatible polymeric blends.

$$\frac{1}{Tg \text{ of blend (°K.)}} = \Sigma \frac{wf_r}{Tg_r} + \frac{wf_a}{Tg_a}$$

where $$wf_r = \frac{\text{weight resin}}{\text{weight resin} + \text{weight amorphous polybutylene phase}}$$

$$wf_a = \frac{\text{weight amorphous polybutylene}}{\text{weight resin} + \text{weight amorphous polybutylene phase}}$$

$Tg_r$ = glass transition resin (°K.)
$Tg_a$ = glass transition amorphous polybutylene phase (°K.)

Table 1b shows that the polybutylene adhesive with 11% coethylene is advantageous for obtaining a lower Tg product which is less brittle. The compromise in achieving these better properties is a slightly lower SAFT (~10° C.) due the lower crystalline melting point. Naphthenic paraffinic oils, paraffinic oils, or rubbers such as ethylene propylene rubber, EPDM, ethylene butylene rubber, saturated thermoplastics elastomers (KRATON ®G Rubbers), or butyl rubbers can be added to help reduce brittleness. Usually only about 10–20% oil can be tolerated or oil exudation from the adhesive will occur.

The viscosity of hot melt adhesives can also be important for good surface wetting and ease of application. The polybutylenes are advantageous again because they can be adjusted by cracking (decreasing the molecular weight with peroxides and temperature) to a wide spectrum of viscosities. Moreover, the variation in viscosities has only a nominal affect on final properties such as SAFT.

TABLE 1b

| Formulations | Calculated Tg's of Adhesive/Resin Formulations | | | | | | |
|---|---|---|---|---|---|---|---|
| | M.I. | Tg (°C.) | Cry.(a) | Am. P. | A | B | C | D | E |
| H-1-B | 123 | −25 | 52% | 48% | 50 | — | — | — | — |
| 1B-coE1.5 | 80 | −26 | 46% | 54% | — | 50 | — | — | — |
| 1B-coE11.0 | 99 | −34 | 35% | 65% | — | — | 50 | 50 | 50 |
| Arkon P-85 | — | 35 | yes | yes | 50 | 50 | 50 | — | 25 |
| Arkon P-125 | — | 66 | yes | yes | — | — | — | 50 | 25 |
| A.O. | — | — | — | — | 0.3 | 0.3 | 0.3 | 0.3 | 0.3 |

| | A | B | C | D | E |
|---|---|---|---|---|---|
| COMMENT: | Brittle | Brittle | Flexible | Brittle | Flexible |
| SAFT (1 Kg), °C. | 92$^{SS}$ | 88$^{SS}$ | 82$^{SS}$/65$^K$ | 84$^K$ | 77$^K$ |
| SAFT (½ Kg), °C. | 75$^K$ | 71$^K$ | | | |
| Calculated Tg of adhesive amorphous | 55 | 51 | 37 | 64 | 52 |

TABLE 1b-continued

| Formulations | M.I. | Tg (°C.) Cry.(a) Am. P. phase, °F. | A | B | C | D | E |
|---|---|---|---|---|---|---|---|

(a)Crystallinity of polybutylene polymers determined by DSC. Melt index versus SAFT to Kraft Paper (KP) and Anodized Aluminum (AnAl), the relationship between service temperature and melt index, is shown in FIGS. 2A (Kraft-Kraft) and 2B (Anodized Aluminum-Anodized Aluminum) for a 50/50 blend of 1B-coE 11.0 polymer/Arkon P-85. The upper position curves present SAFT test results with a ½ kg load; the lower position curves with a 1 kg load.

Some drop in service temperature was found as polymer melt index was increased on either KP or AnAl substrates. At the lighter load, the magnitude is about 5° C. over the 10 M.I. range. At heavier load (1 kg), the effect is more pronounced on KP—about 11° C. drop over the same M.I. span.

A relatively small difference in SAFT is seen when results are compared between substrates; SAFT seems to be slightly lower at a given M.I. on KP versus AnAl.

EXAMPLE III

TABLE II

Polybutylene Comonomer Content versus Selected Adhesive Properties

|  | A | B | C |
|---|---|---|---|
| Homopolymer 1-butene, 123 M.I. | 50 | — | — |
| 1-B-coE1.5, 80 M.I. | — | 50 | — |
| 1-B-coE11.0, 99 M.I. | — | — | 50 |
| Arkon P-85 | 50 | 50 | 50 |
| Irganox ® 1010 | 0.3 | 0.3 | 0.3 |
| Test Results: | | | |
| SAFT[1], °C. | 92 | 88 | 82 |
| Melting point[2], °C. | 123 | 108 | 99 |
| Open time, minutes | 30–40 | 60–120 | >300 |
| Lap Shear, KN (lbs) | | | |
| 1 hour | — | — | .71 (160) |
| 1 week | — | — | 2.47 (550) |
| Flexible/Brittle | Brittle | Brittle | Flexible |
| Melt viscosity @ 177° C., Pa·s | 20–25 | 20–25 | 20–25 |

[1]½ kg load on 25 × 25 mm bond area. Cohesive failure was noted on all samples. Specimens were prepared by bonding to preheated stainless steel @ 180° C.
[2]Neat polymer, Form I crystalline structure.

In Table II SAFT, open time, flexibility/brittleness, lap shear strength and viscosity were compared for three test recipes based on polybutylene polymers with varying comonomer content as 50-50 blends with the Arkon P-85.

The mating substrates were individually coated, then brought together under moderate pressure. Such bonds could be accomplished over a period of hours after the substrates have been coated. We have found that open time is a strong function of the comonomer content of the polymer. This result can be explained on the basis of excellent resin compatibility with the amorphous phase, amorphous phase level found in each polymer, and the slower rate of crystalline transformation found in the higher comonomer content polymers. Open time for conventional hot melt adhesives such as polyethylene or EVA is on the order of 15–60 seconds. Formulation C, polybutene-1 with 11% ethylene, exhibited on open time of more than 300 minutes and was flexible at room temperature. Lap shear results are of interest—a change in adhesive strength was noted with time as the polybutylene crystallization occurred. The viscosities measured indicate little difference among these polymers at these high (~100) melt indicies.

EXAMPLE IV

Waxes in Polybutylene Adhesive Formulations—Table III summarizes results found for test recipes containing wax, either microcrystalline or paraffinic.

TABLE III

Waxes in Polybutylene Adhesive Formulations

|  | Ref. | A | B | C |
|---|---|---|---|---|
| 1-B-coE 11.0, M.I. 100 | 30 | 30 | 30 | 30 |
| Arkon P-85 | 70 | 50 | 50 | 50 |
| 60° C. microcrystalline wax | — | 20 | — | — |
| 80° C. microcrystalline wax | — | — | 20 | — |
| 61° C. paraffinic wax | — | — | — | 20 |
| Irganox ® 1010 | 0.3 | 0.3 | 0.3 | 0.3 |
| Test Results: | | | | |
| SAFT[1], °C. | | | | |
| ½ kg load | — | 57° C. | 59° C. | — |
| 1 kg load | — | 47° C. | 52° C. | — |
| Flexible/Brittle | Brittle | Flexible | Flexible | Brittle |
| Melt Viscosity @ 177° C., Pa·s | 3.4 | 1.2 | 1.7 | 1.0 |

[1]Kraft paper to kraft paper heat seal bond, 25 mm × 25 mm square, adhesive thickness 100 to 125 microns.

Microcrystalline wax appears to be a reasonably compatible diluent for polybutylene polymers. Note that the effect of softening point of the given microcrystalline wax is not reflected strongly in a service temperature difference for the finished adhesive.

Paraffinic wax produces a brittle product. (See formulation C). It would appear to be incompatible with either amorphous or crystalline polymer phases.

Microcrystalline wax is also an effective additive to reduce viscosity, as seen in formulations A and B.

TABLE IV

Comparison of Hot Melt Adhesive Open Time and Metal Adhesion

|  | 1 | 2 | 3 | 4 | 5 | 6 | 7 |
|---|---|---|---|---|---|---|---|
| Eastobond A3 PE Adhesive[1] | 100 | | | | | | |
| Amscomelt A132 EVA Adhesive[2] | | 100 | | | | | |
| H-1-B (123 MI) | | | 50 | | | | |
| 1B-CoE1.5 (~80 MI) | | | | 50 | | | |
| 1B-CoE11.0 (99 MI) | | | | | 50 | 40 | 30 |
| Arkon P-85° C.[4] | | | 50 | 50 | 50 | 50 | 50 |
| Shellwax ® 500[3] | | | | | | 10 | 20 |
| Irganox 1010 | 0.3 | 0.3 | 0.3 | 0.3 | 0.3 | 0.3 | 0.3 |
| Open Time (minutes) | <1 | <1 | 30–40 | 60–120 | >300 | > | >20 |
| Adhesion to cold | | | | | | | |
| Anodized Aluminum | No | Yes | — | — | Yes | Yes | Yes |
| Stainless Steel (316) | No | No | — | — | Yes | Yes | Yes |
| Lap Shear[5] (psi) | | | | | | | |
| 1 hour | 615 | 540 | | | 160 | | 240 |
| 1 week | 490 | 560 | | | 550 | | 330 |
| SAFT (°F.) | 188 | 148 | 197 | 190 | 180 | 167 | 141 |
| Melt Viscosity | 2.2 | 1.7 | | | 46 | 12 | 32 |

TABLE IV-continued
Comparison of Hot Melt Adhesive Open Time and Metal Adhesion

| | 1 | 2 | 3 | 4 | 5 | 6 | 7 |
|---|---|---|---|---|---|---|---|
| (Pa s, 350° F.) | | | | | | | |
| Comments | | | brittle | brittle | flexible | flexible | flexible |

(1)Eastman Kodak
(2)Union Oil
(3)Shell Chemical Company
(4)Arwakawa
(5)1" × 1"
(6)1" × 1", ½ Kg metal As may be seen in Table IV, the only formulations which exhibited both long open time as well as cold metal adhesion were numbers 5, 6 and 7, which contained 50%, 40% and 30% by weight, respectively, 1B-coE 11.0. Numbers 6 and 7 also contained 10 and 20% by weight, respectively, of Shellwax ®500. Formulations #1 and #2 (polyethylene and polyethylene-/vinylacetate adhesives) exhibited extremely short open times of less than 1 minute, each. Number 1 did not bond to either the aluminum or the stainless steel. Number 2 did not bond to the stainless steel. Formulations #3 and #4 (PB homopolymer and PB copolymer with 1.5% ethylene each mixed with Arkon P-85) exhibited long open time and were brittle.

Thus, formulations with Arkon P-85 and from about 30% by weight to about 50% by weight 1B-coE 11.0 and from about 10% by weight to about 20% by weight Shellwax ®500 exhibit long open time values, as well as good adhesion to cold anodized aluminum and stainless steel and are flexible. Most preferably, 50% by weight 1B-coE 11.0 and 50% by weight Arkon P-85 resin, with about 0.3% antioxidant, yields an open time of greater than 300 minutes (5 hours) and exhibits good adhesion to cold anodized aluminum as well as stainless steel. Such properties allow adhesion on metal surfaces with open times on the order of anywhere from several minutes to several hours. This is particularly advantageous, for example, in auto plant assembly lines where the adhesive is applied to a large metal surface area which is not bonded to another piece of equipment until some point further down the assembly line.

Table V studies interactions of resin Tg and polybutylene adhesive properties for the 1B-coE 11.0 polymer.

Composition A employed 50/50 polymer/125° C. softening point (S.P.) resin blend. When compared with composition B (lower Tg 85° C. S.P. resin) we found that indeed the A formulation was brittle, and thus, not as suitable as an adhesive.

Composition C employed a 50/25-25 combination of polymer and a blend of the two resins in equal portions. The composition was flexible and had an intermediate service temperature. Thus, the resin Tg plays a crucial role in setting the temperature at which a glassy versus compliant adhesive is observed.

When a portion of the polymer was substituted with wax (Compositions D and E), a drop in viscosity was achieved, as well as a drop in service temperature. In comparing compositions E and B, while both have equally good upper service temperatures, composition E has almost a ten-fold reduction in hot melt viscosity than composition B. Thus, addition of the microcrystalline wax produces a ten-fold decrease in hot melt viscosity, while maintaining the service temperature. Even lower viscosity was obtained in D (twenty-fold) with a service temperature upper limit of 57° C.

TABLE V
Interplay of Resin Tg and Polybutylene Adhesive Properties

| | A | B | C | D | E |
|---|---|---|---|---|---|
| 1-B-coE11.0, M.I. 100 | 50 | 50 | 50 | 30 | 30 |
| Arkon P-85, Tg = 35° C. | — | 50 | 25 | 50 | — |
| Arkon P-125, Tg = 66° C. | 50 | — | 25 | — | 50 |
| 60° C. microcrystalline wax | — | — | — | 20 | 20 |
| Irganox 1010 | 0.3 | 0.3 | 0.3 | 0.3 | 0.3 |
| Test Results: | | | | | |
| SAFT, °C. (½ Kg, Kraft) | 84 | 65 | 77 | 57 | 65 |
| Flexible/Brittle | Brit. | Flex. | Flex. | Flex. | Flex. |
| Melt Viscosity @ 177° C., Pa·s | 25 | 20 | 26 | 1.2 | 2.5 |

Deviations in the above described materials and/or methods may be apparent to one of ordinary skill in the art.

What is claimed is:

1. A hot melt adhesive with long open time comprising a blend of:
   from about 25% by weight to about 90% by weight of an at least partially crystalline copolymer of butene-1 and ethylene, where the ethylene content is from about 5.5% by weight to about 10.0% by weight of said copolymer;
   from about 10% by weight to about 60% by weight of an aliphatic, substantially non-polar resin selected from the group consisting of $C_5$–$C_9$ stream resins, polyterpenes and hydrogenated resins with softening points in a range of 70° C. to 125° C.;
   from about 0.1% by weight to about 0.5% by weight antioxidizing agent; and
   from about 0% by weight to about 20% by weight of a microcrystalline wax.

2. The hot melt adhesive of claim 1, wherein said blend comprises
   from about 45% by weight to about 55% by weight of said copolymer of butene-1 and ethylene, where the content of said ethylene is about 5.5% by weight of said copolymer;
   from about 45% by weight to about 55% by weight of said aliphatic, substantially non-polar resin, said resin being a partially hydrogenated $C_9$ based resin with a softening point of about 85° C.; and
   from about 0.2% by weight to about 0.4% by weight of said antioxidizing agent.

3. The hot melt adhesive of claim 1, wherein said antioxidizing agent is tetrakis methylene(3,5-di-tert-butyl-4-hydroxyhydrocinnamate)methane.

4. A hot melt adhesive with long open time, comprising a blend of:
   from about 45% by weight to about 55% by weight of an at least partially crystalline copolymer of butene-1 and ethylene, where the ethylene content is about 5.5% by weight of said copolymer;
   from about 45% by weight to about 55% by weight of a partially hydrogenated $C_9$ based resin with a softening point of about 85° C.; and
   from about 0.2% by weight to about 0.4% by weight antioxidizing agent.

5. The hot melt adhesive of claim 4, wherein said antioxidizing agent is tetrakismethylene(3,5-di-tert-butyl-4-hydroxyhydrocinnamate)methane.

6. The polymer blend of claim 1 or 4.

* * * * *